United States Patent
Soltanian et al.

(10) Patent No.: US 7,019,691 B1
(45) Date of Patent: Mar. 28, 2006

(54) METHOD AND APPARATUS FOR BEACON DISCOVERY IN A SPREAD SPECTRUM CELLULAR RADIO COMMUNICATION SYSTEM

(75) Inventors: Amir Soltanian, Potomac, MD (US); Mirjana Peric, Bethesda, MD (US); Vikash Srivastava, Boyds, MD (US)

(73) Assignee: PCTEL, Maryland, Inc., Germantown, MD (US)

( * ) Notice: Subject to any disclaimer, the term of this patent is extended or adjusted under 35 U.S.C. 154(b) by 0 days.

(21) Appl. No.: 11/100,937

(22) Filed: Apr. 7, 2005

(51) Int. Cl.
*H01Q 3/22* (2006.01)

(52) U.S. Cl. .................................... 342/368; 342/374

(58) Field of Classification Search ............ 342/357.06, 342/368, 372, 374; 701/207, 213
See application file for complete search history.

(56) References Cited

U.S. PATENT DOCUMENTS

| | | | |
|---|---|---|---|
| 5,689,270 A * | 11/1997 | Kelley et al. .......... | 342/357.09 |
| 5,982,819 A * | 11/1999 | Womack et al. ............ | 375/316 |
| 6,157,820 A | 12/2000 | Sourour et al. | |
| 6,285,664 B1 | 9/2001 | Bernstein et al. | |
| 6,618,432 B1 | 9/2003 | Ganesh | |
| 6,693,884 B1 | 2/2004 | Gutowski | |
| 2002/0110151 A1 | 8/2002 | Dickey | |
| 2002/0181431 A1 | 12/2002 | Lorenzen | |
| 2003/0007576 A1 | 1/2003 | Alavi et al. | |
| 2003/0109256 A1 | 6/2003 | Holcman | |
| 2004/0146014 A1 | 7/2004 | Hammons, Jr. et al. | |
| 2004/0160933 A1 | 8/2004 | Odenwalder et al. | |

OTHER PUBLICATIONS

"Design and Implementation of a Pilot Signal Scanning Receiver for CDMA Personal Communication Services Systems", by T. Keith Blankenship, May 1998, pp. i-24.

"The Super Eagle" Manual Version 2.5, Berkeley Varitronics Systems, Inc., 1998.

"A New Class of Precision UTC and Frequency Reference Using IS-95 CDMA Base Station Transmissions" by Bruce M. Penrod, EndRun Technologies, 2001.

"Eagle CDMA Pilot Scanner", available at http://www.bvsystems.com/Products/CDMA/Eagle/eagle.htm.

(Continued)

*Primary Examiner*—Dao Phan
(74) *Attorney, Agent, or Firm*—Gordon & Jacobson, P.C.

(57) ABSTRACT

An apparatus (and corresponding methodology) for discovering beacon signals in a spread spectrum radio communication system is selectively operable in one of two modes. The first mode employs a local reference timing signal, while the second mode employs a GPS-derived reference timing signal. Preferably, the first mode identifies a baseline beacon signal that satisfies a constraint based upon time delays for detected beacon signals which are indicative of the relative distance of the transmitting base stations, thus providing selection of a baseline beacon signal that originates from a relatively close base station. The index of the baseline beacon signal is recovered and then used together with relative timing derived from the local reference timing signal to assign indices to other detected beacon signals. In another aspect, control means is provided for selectively switching between the first and second modes in accordance with a plurality of user-selectable modes, which preferably include a GPS-priority mode (whereby the control means automatically switches between the first and second modes based upon GPS signal receive status) and an Indoor mode (whereby the control means operates in the first mode irrespective of GPS signal receive status).

30 Claims, 5 Drawing Sheets

OTHER PUBLICATIONS

"New Measurements with CDMA Field Test Equipment", by Ray Chadwick, Berkeley Varitronics Systems, Inc. Originally appeared in Microwave Product Digest, Auguest 1999.

"Raven™ CDMA PN Scanner", technical specifications; Berkeley Varitronics Systems, Inc.

"Preliminary Technical Specifications . . . cdma2000 Receiver (SeeGull™ LX) with Release 3.0 Options", PCTEL RF Solutions Group, Aug. 2004.

"PCTEL's Introduces CDMA2000 1xEV-DO Scanning Receiver", 3GNewsroom.com, available at http://www.3gnewsroom.com/3g_news/oct_04/news_5110.shtml.

* cited by examiner

METHOD AND APPARATUS FOR BEACON DISCOVERY IN A SPREAD SPECTRUM CELLULAR RADIO COMMUNICATION SYSTEM

BACKGROUND OF THE INVENTION

1. Field of the Invention

This invention relates broadly to radio communication systems. More particularly, this invention relates to Personal Communication Service (PCS) cellular communication systems, such as CDMA systems, that employ a beacon signal (e.g., a pseudo-noise digital sequence in CDMA) to communicate from base stations to mobile units within the system.

2. State of the Art

Code Division Multiple Access (CDMA) cellular systems employ a digital wireless transmission method in which pilot signals are transmitted from base stations to mobile units. The pilot signal is an unmodulated, direct sequence spread spectrum signal transmitted continuously by a base station. The pilot signal allows a mobile station to acquire the timing of the forward channel (from the base station to the mobile unit), provides a phase reference for coherent demodulation, and provides a means for making signal strength comparisons between base stations for determining when to handoff. The pilot signal is a Walsh code "0" spread by a pair of modified maximal length pseudo-noise sequences. The relative phase of the pseudo-random sequence pair corresponds to different forward channels within a common frequency band (which is centered around 800 MHz or 1900 MHz for current systems). This pseudo-random sequence pair is typically referred to as a short PN sequence or code. The short PN sequence has a period of exactly $2^{15}$ (or 32,768) chips and the relative phase of the short PN sequences are offset by an integer multiple of 64 chips (which is 52.083 µsec). Therefore, there are exactly 32,768/64 or 512 phase offsets of 64 chips each. One of the possible 512 phase offsets is assigned to each base station. This phase offset, typically referred to a PN offset, allows the mobile unit to identify that base station by its offset.

The synchronization of the base stations of the CDMA system is achieved by the use of Global Positioning System (GPS) receivers at each base station location. Aided by appropriate stable clock generators, these GPS receivers supply accurate timing information to the base station.

Pilot pollution occurs within the coverage area of the CDMA cellular system when numerous pilot signals are received with relatively equal signal strength. Such pilot pollution is detrimental because it may cause dropped calls and decreased capacity. Thus, power optimization is advantageous as it reduces pollution from different offset pilots. Such optimization is typically accomplished by drive-testing the intended coverage area of the CDMA cellular system with a pilot scanner that detects the received pilot signals and measures/records the signal strengths of the detected piloted signals at various locations within the intended coverage area of the CDMA cellular system. The pilot scanner requires access to an accurate clock source. Typically, the Global Positioning System (GPS) is used as the clock source. As such, these devices typically have GPS receivers. Whenever the GPS signals are available, that is in most outdoor settings, the GPS receiver provides an accurate and convenient way of synchronization. However, it is not practical for settings where there is no reliable GPS coverage, such as indoor settings, some urban locations and wherever access to GPS is obstructed.

Another possible approach, which is suitable for indoor analysis where access to GPS is obstructed, relies on the information contained in the CDMA signal itself to derive the accurate frequency and timing information. In this approach, the scanner demodulates the synchronization channel and recovers the PN offset from the body of the L3 message within the synchronization channel. The time-of-arrival of the pilot that corresponds to the recovered PN offset is used as a reference for the timing of the other detected pilot signals. Such timing is then used to determine the PN indices for the other detected pilots. The pilot that is selected for synchronization channel processing plays an important role in the correct detection of the other pilot signals. If this selected pilot originates from a base station that is very far from the pilot scanner, the timings that are referenced to the selected pilot will typically have large errors that lead to further errors in the determination of PN indices based thereon. Thus, in certain circumstances, this approach fails to accurately identify the PN indices of the detected pilots.

Thus, there remains a need to provide an improved apparatus and methodology for evaluating CDMA signal propagation and coverage, including pilot number offset measurements, in indoor and similar settings with no or limited access to GPS signals.

SUMMARY OF THE INVENTION

It is therefore an object of the invention to provide an improved apparatus and methodology for effective pilot number offset measurements in locations with access to GPS signals as well as locations (such as indoor or obstructed settings) with no or limited access to GPS signals.

It is a further object of the invention to provide such an apparatus and methodology that minimizes the errors in pilot number offset measurements when more than one pilot is discovered and the apparatus is positioned at locations with no or limited access to GPS signals.

It is also an object of the invention to provide such an apparatus and methodology that is easily controlled by the user to operate one of a plurality of modes suitable for its location (e.g., whether it is positioned in a location with or without access to GPS signals).

In accord with these objects, which will be discussed in detail below, an apparatus (and corresponding methodology) for discovering beacon signals in a spread spectrum radio communication system is selectively operable in one of two modes. The first mode employs a local reference timing signal, while the second mode employs a GPS-derived reference timing signal. Preferably, the first mode identifies a baseline beacon signal that satisfies a constraint based upon time delays for detected beacon signals (which are indicative of the relative distance of the transmitting base stations) and power values (which are indicative of the strength of the detected beacon signals), and thus provides selection of a baseline beacon signal that originates from a relatively close base station. The index of the baseline beacon signal is recovered and then used together with relative timing derived from the local reference timing signal to assign indices to other detected beacon signals.

In another aspect, control means is provided for selectively switching between the first and second modes in accordance with a plurality of user-selectable modes, which preferably include a GPS-priority mode (whereby the control means automatically switches between the first and second modes based upon GPS signal receive status) and an Indoor mode (whereby the control means operates in the first mode irrespective of GPS signal receive status).

It will be appreciated that such mechanisms are applicable to CDMA systems for use in detecting pilot signals and accurately assigning indices to the detected pilot signals in locations when the GPS signal is available and when unavailable. Moreover, such mechanisms provide easy and effective user control over operational modes that are suitable for different locations (e.g., one operation mode suitable for locations with access to GPS signals, and another operational mode suitable for locations without access to GPS signals). Such pilot scanning mechanisms are applicable to test measurement devices (that collect and store signal propagation data and coverage data) in a CDMA network as well as other spread spectrum cellular radio communication systems that employ a beacon signal for communication between base stations and mobile units of the system.

Additional objects and advantages of the invention will become apparent to those skilled in the art upon reference to the detailed description taken in conjunction with the provided figures.

DETAILED DESCRIPTION

Figure 1:
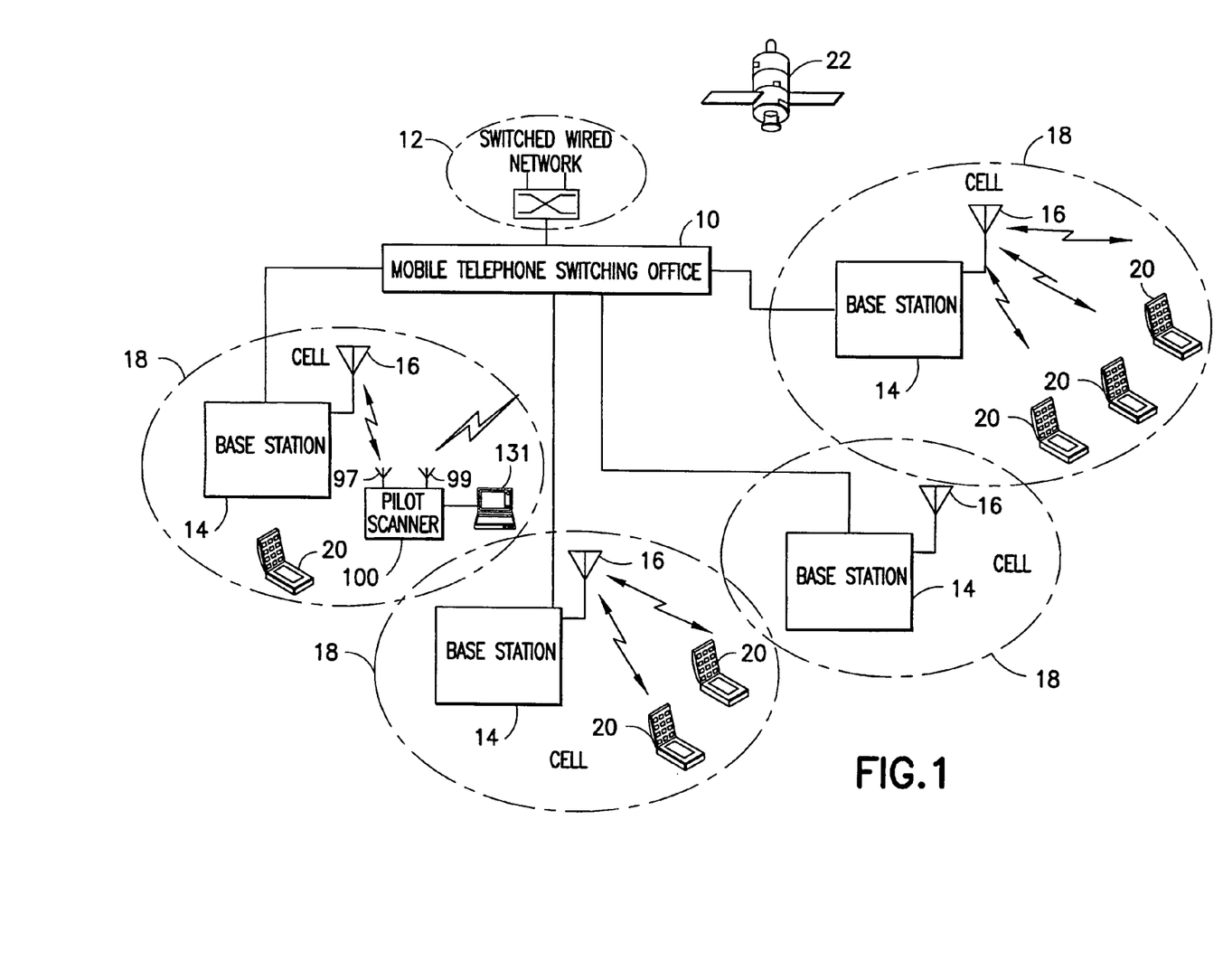
FIG. 1 is a schematic block diagram of a CDMA network in which the pilot scanner device of the present invention can be used.

Turning now to FIG. 1, there is shown a schematic diagram of a typical CDMA network. A Mobile Telephone Switching Office (MTSO) 10, which is also commonly referred to as a Mobile Switching Center (MSC), provides for call routing between the base stations 14 of the network and the Public Switched Telephone Network 12. Each base station 14 includes a fixed position multi-channel transceiver that is coupled to a cellular antenna 16. Each base station 14 and antenna 16 act as a communication gateway over a local geographical area called a cell 18. The cells 18 of the network are geographically distributed in a manner that defines the coverage area of network. It is common for several cells 18 to be sectored around a common antenna tower. The tower will have several directional antennas, each covering a particular area. This co-location of several antennas is sometimes called a cell-site or a base transceiver station.

Each base station continuously transmits a pilot signal that provides a beacon for any mobile units 20 that are in its corresponding cell 18. The pilot signal is an unmodulated, direct sequence spread spectrum signal, which is received and used by the mobile units in the cell to acquire the timing of the forward channel (from the base station to the mobile unit), as a phase reference for coherent demodulation, and as means for making signal strength comparisons between base stations for determining when to handoff. The pilot signal is a Walsh code "0" spread by a pair of modified maximal length pseudo-noise (PN) sequences. The relative phase of the PN sequence pair corresponds to different forward channels within a common frequency band (which may be centered around 800 MHz, 1900 MHz or other predetermined frequency band). This PN sequence pair is typically referred to as a short PN sequence or code. The short PN sequence has a period of exactly $2^{15}$ (or 32,768) chips and the relative phase of the short PN sequences are offset by an integer multiple of 64 chips (which is 52.083 µsec). Therefore, there are exactly 32,768/64 or 512 phase offsets of 64 chips each. One of the possible 512 phase offsets is assigned to each base station 14. This phase offset, typically referred to a PN offset, allows the mobile unit 20 to identify that base station 14 by its offset. The PN offset index, which is an integer in the range between 0 and 511, specifies the offset time (in multiples of 64 chips) from the zero offset PN sequence. The zero offset PN sequence starts at the beginning of every even second in the system time.

The system time and thus the synchronization of the base stations 14 is achieved by the use of the Global Positioning System (GPS) satellite constellation 22 and GPS receivers at each base station location 14. Aided by appropriate stable clock generators, these GPS receivers supply accurate timing information to the base station 14.

A pilot scanner device 100 in accordance with the present invention can be located in any one of the cells 18 of the network. The pilot scanner device 100 cooperates with a computer system 131 operably coupled thereto to measure and store signal quality metrics of the CDMA signals transmitted from the corresponding base station 14. Such metrics are typically gathered as part of a drive-test over multiple locations within the cells 18 of the network and used in post-processing network optimizations, such as frequency planning optimizations and coverage optimizations.

Figure 2:
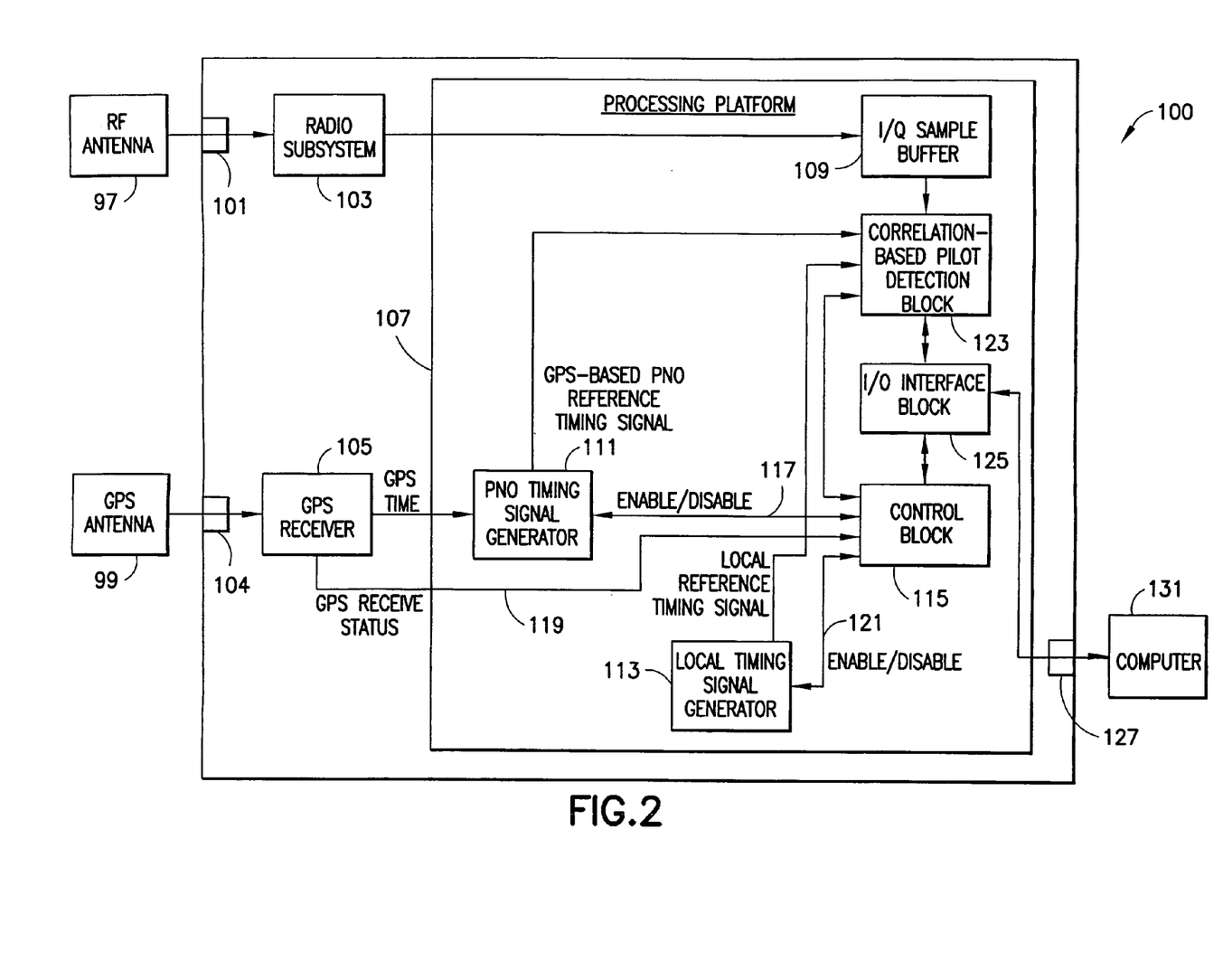
FIG. 2 is a functional block diagram of a pilot scanner device in accordance with the present invention.

Turning now to FIG. 2, there is shown a block diagram of a pilot scanner device 100 in accordance with the present invention. The pilot scanner device 100 generally includes a radio subsystem 103 (e.g., an RF tuner and quadrature demodulator) and a GPS receiver 105 that interface to a processing platform 107. The radio system 103 cooperates with an RF antenna 97, which is coupled thereto via port 101, to receive an RF frequency band that carries the pilot signals of the CDMA cellular system (which is centered around 800 MHz or 1900 MHz for current systems). The radio subsystem 103 downconverts the received RF frequency band to a baseband signal and samples the baseband signal to derive baseband quadrature (I, Q) samples in digital form that represent the received pilot signals. The processing platform 107 includes I and Q sample buffers 109 that store the baseband I and Q samples, respectively. The GPS receiver 105 cooperates with a GPS antenna 99, which is coupled thereto by port 105, to receive an RF frequency band that carries the GPS signals of the GPS system. The GPS receiver 105 downconverts and processes the received RF frequency band to recover a GPS time signal therein. The GPS time is synchronized to the Universal Coordinate Time (UTC) and it provides a system wide time frame for the CDMA network.

The processing platform 107 also includes a first timing signal generator 111, a second timing signal generator 113 and a pilot detection block 123 that each interface to a control block 115. The processing platform 107 is preferably realized by a digital signal processor. Alternatively, it can be realized by an FPGA, an ASIC or other suitable data processing means. The timing synthesis components (111, 113) are preferably realized as programmed timers that are part of the processing platform 107. Alternatively, such components can be realized by electronic circuitry that is interfaced to the processing platform 107 or other suitable means.

The first timing signal generator 111 receives the GPS time signal output by the GPS receiver 105 and uses the GPS time signal to generate a GPS-based reference timing signal. In the preferred embodiment, the GPS-based reference timing signal is synchronous with the start of the PN0 pilot signal timing (which occurs every even second as defined by the GPS time signal). In this preferred embodiment, the GPS-based reference timing signal has a period of two seconds with a rising edge that occurs at the start of the zero offset pilot frame and includes 75 pilot frames. The second timing signal generator 113 generates a local reference timing signal. In the preferred embodiment, the local reference timing signal is similar to the GPS-based reference timing signal in that it has a period of 2 seconds. However, it is not synchronized to the GPS time signal output by the GPS receiver 105 and thus it could have any random delay relative to the start of the PN0 pilot signal timing.

The pilot detection block 123 correlates the baseband I and Q signal samples stored in the sample buffers 109 with a predetermined PN sequence over different phase delays. The correlation peaks that exceed a predetermined threshold are identified. Each of these correlation peaks represent an indication of the presence of a detected pilot signal having the same phase as one of the locally generated PN sequences. These correlation peaks are then mapped to corresponding PN indices which identify the estimated time offset of the correlation peaks relative to the start of the PN0 phase in the GPS/CDMA system time frame. The difference between the time-of-arrival of each correlation peak/PN index and the start of the nearest pilot offset is measured and stored. Signal quality data, such as signal-to-interference ratios Ec/Io and aggregate Ec/Io, are measured and stored for each correlation peak/PN index. Ec/Io is the relative signal strength or the fractional total power received over a particular power channel, where Ec represents the energy per chip and Io represents the total received power. The PN indices and signal quality data associated therewith are supplied to an input/output interface block 125 for output to a computer system 131 coupled thereto via port 127. The computer system 131 preferably provides data storage means for storing such data over a large number of locations together with a graphical user interface that displays such data to the user in real time as is well known.

As part of the pilot detection block 123, the mapping of correlation peaks to PN indices is accomplished in one of two operational modes as dictated by the control block 115. In the first mode (labeled "use_GPS_timing"), the relative timing of the correlation peaks (and the assignment of PN indices based thereon) is referenced to the GPS-based reference timing signal output by the first timing signal generator 111. In the second mode (labeled "use_local_timing"), the relative timing of the correlation peaks (and the assignment of PN indices based thereon) is referenced to the local reference timing signal output by the second timing signal generator 113. Details of exemplary operations carried out by the pilot detection block 123 are discussed below in conjunction with the flow chart of FIG. 4.

In the preferred embodiment, the input/output interface block 125 and the control block 115 cooperate to provide the user with the ability to control the device in accordance with one of a plurality of user-selected operational modes. Preferably, the graphical user interface of the computer 131 interacts with the user to allow the user to pick one of the plurality such user-selected operational modes, and the computer 131 communicates data that identifies the "picked" mode to the input/output interface block 125 via port 127. Such data (or a status flag based thereon) is communicated to the control block 115, which controls the operation of the device 100 in accordance with the "picked" mode. Other input mechanisms that allow the user to select between the plurality of user-selected operation modes, such as keypads and/or scrolling displays, can be employed as well.

Figure 3:
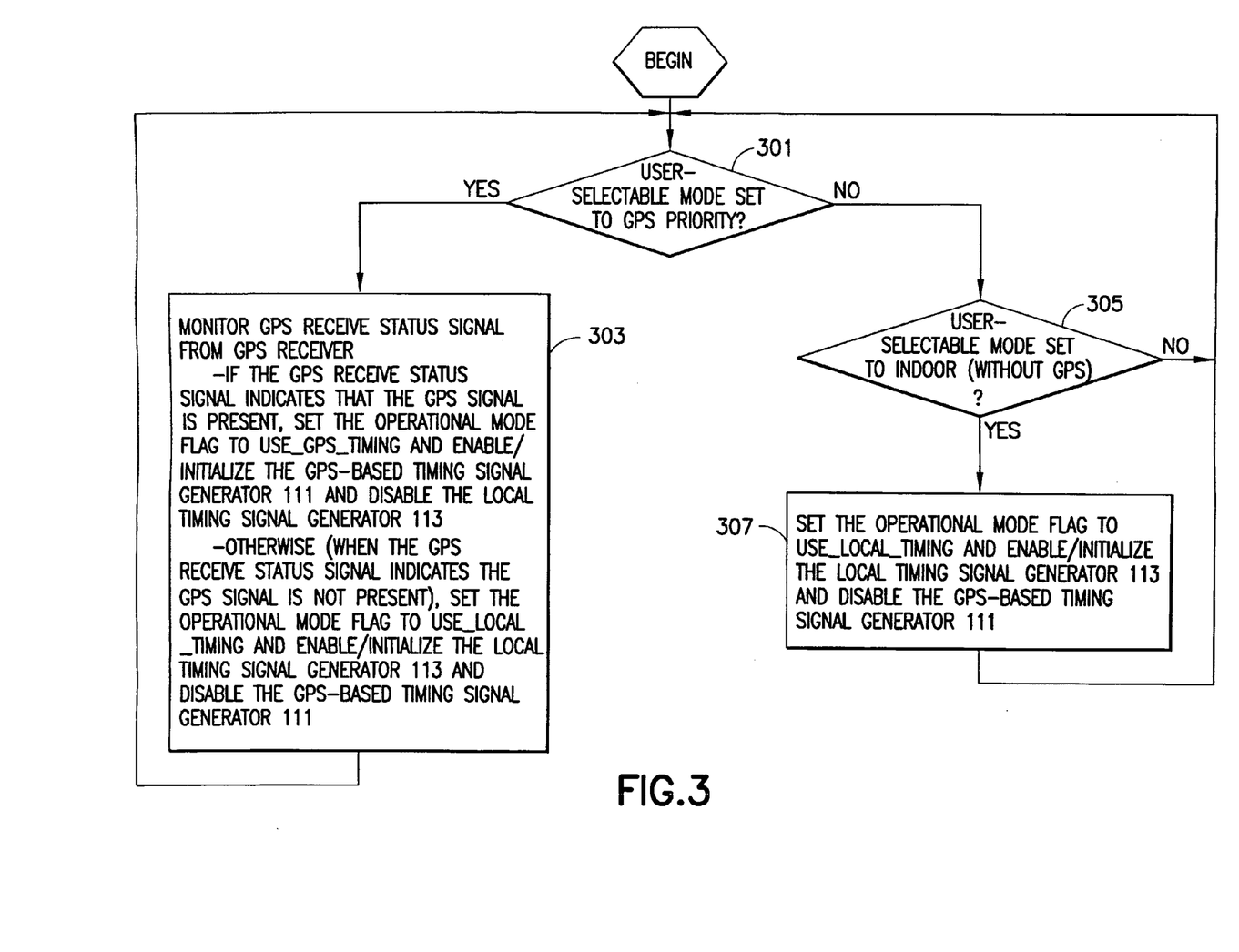
FIG. 3 is a flow chart illustrating a preferred embodiment of control operations carried out by the control block of FIG. 2.

FIG. 3 illustrates a preferred embodiment where the plurality of user-selectable modes includes "a GPS priority mode" and "an Indoor (without GPS) mode". In the "GPS priority mode" (steps 301, 303), the control block 115 monitors the status of the GPS receiver 105, which is indicated by the GPS Receive status signal supplied to control block 115 over path 119. When the GPS receiver 105 is successfully receiving the GPS signals, a predetermined operational mode flag is set to "use_GPS_timing" (which is communicated to block 123 for pilot detection as described above), the first timing signal generator 111 is enabled/initialized via path 117 such that it generates the GPS-based reference timing signal, and the second timing signal generator 113 is disabled via path 121 such that it does not generate the local reference timing signal. Alternatively, the control block 115 causes the local reference timing signal generated by block 113 to be ignored by block 123. Yet, when the GPS Receiver 105 is not successfully receiving the GPS signals (for example, in locations where there is no reliable GPS coverage such as indoor settings, some urban locations and wherever access to GPS is obstructed), the predetermined operational mode flag is set to "use_local_timing" (which is communicated to block 123 for pilot detection as described above), the second timing signal generator 113 is enabled/initialized via path 121 such that it generates the local reference timing signal, and the first timing signal generator 111 is disabled via path 117 such that it does not generate the GPS-based reference timing signal. Alternatively, the control block 115 causes the GPS-based reference timing signal generated by block 111 to be ignored by block 123. Thus, in this "GPS Priority" mode, the GPS-derived timing reference signal is used for pilot detection when the GPS time signal is available, and the locally-derived timing reference signal is used for pilot detection when the GPS time signal is not available.

In the "Indoor (without GPS)" mode (steps 305, 307), the control block 115 sets the predetermined operational mode flag to "use_local_timing" (which is communicated to block 123 for pilot detection as described above), the second timing signal generator 113 is enabled/initialized via path 121 such that it generates the local reference timing signal, and the first timing signal generator 111 is disabled via path 117 such that it does not generate the GPS-based reference timing signal. Alternatively, the control block 115 causes the GPS-based reference timing signal generated by block 111 to be ignored by block 123. Thus, in this "Indoor (without GPS)" mode, the locally-derived timing reference signal is used for pilot detection even when the GPS time signal is available.

Figures 4, 4B:
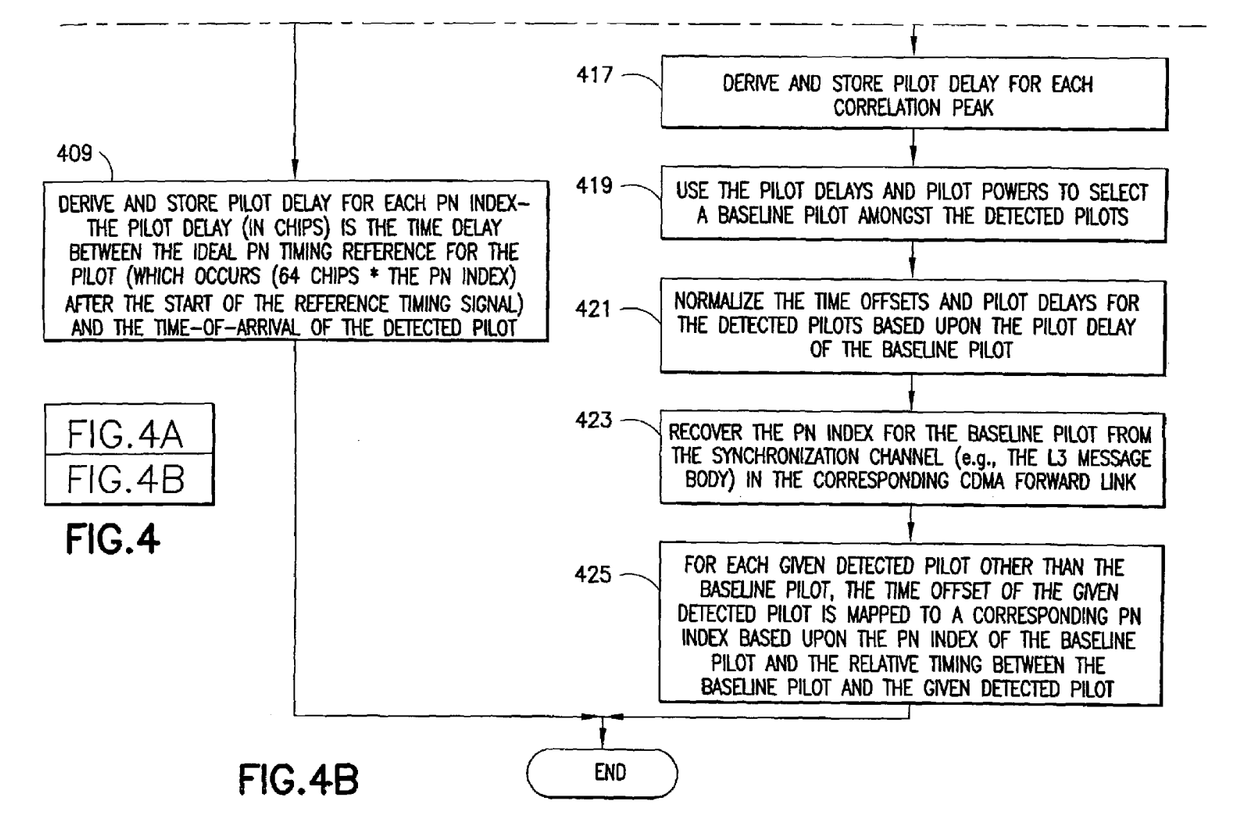
FIG. 4 is a flow chart illustrating a preferred embodiment of correlation-based pilot discovery operations carried out by the pilot detection block of FIG. 2.
Figure 4A:
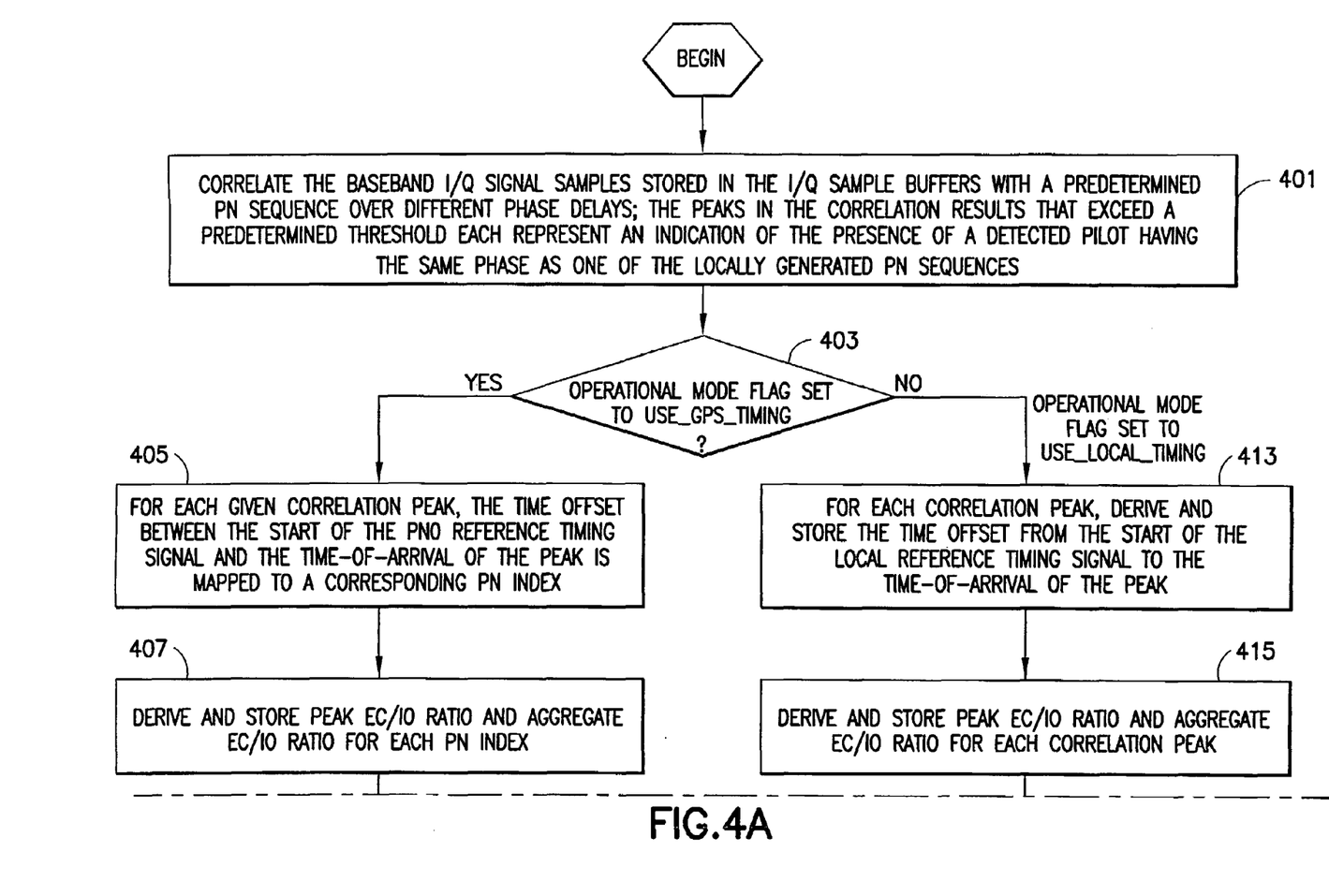

FIG. 4 illustrates exemplary operations carried out by the pilot detection block 123 in accordance with a preferred embodiment of the present invention. The operations begin in block 401 wherein the baseband samples stored in the I and Q sample buffers 109 are correlated with a predetermined PN sequence over different phase delays. The local peaks in the correlation results that exceed a predetermined threshold are identified. Each of these correlation peaks represents an indication of the presence of a detected pilot signal having the same phase as one of the locally-generated PN sequences.

In block 403, it is determined whether the predetermined operational mode flag (which is set by the control block 115 preferably in accordance with the control operations of FIG. 3) is set to "use_GPS_timing". If so, the operations continue along the path of blocks 405–409 wherein the correlation peaks identified in block 403 are mapped to PN indices using the GPS-derived PN0 timing reference signal generated by the first timing signal generator 111; otherwise the operations branch to the path of blocks 413–425 wherein the correlation peaks identified in block 403 are mapped to PN indices using the locally-derived timing reference signal generated by the second timing signal generator 113 as described below.

In block 405, for each given correlation peak identified in block 403, the time offset between the start of the PN0 reference timing signal and the time-of arrival of the given correlation peak is mapped to a corresponding PN index (e.g., one of the 512 possible PN indices defined by an integer range between 0 and 511). Note that ideally the correlation peaks would arrive at time offsets that occur at 64 chip intervals from the start of the PN0 reference timing signal. However, path delay from the base station(s) to the location of the device 100 will cause deviations from this ideal case and thus require that a range of timing offsets be mapped to a given PN index. More particularly, a time offset between 0 and 63 chips is mapped to the PN index of integer 0, a time offset between 64 and 127 chips is mapped to the PN index of integer 1, a time offset between 128 and 191 chips is mapped to the PN index of integer 2, etc.

In block 407, signal quality data, such as the signal-to-interference ratio Ec/Io and aggregate Ec/Io, are measured and stored for each correlation peak/PN index generated in block 405.

Finally, in block 409, the pilot delay for each correlation peak/PN index is derived and stored, and the pilot detection operations end for the particular location. In block 409, the pilot delay is calculated as the time delay between the ideal PN timing reference for the pilot (which occurs at (64 chips*the PN index for the pilot) after the start of the PN0 reference timing signal) and the time of arrival of the detected correlation peak.

During the operations of blocks 413–425, the predetermined operational mode flag is set to "use_local_timing". This flag is set by the control block 115 preferably in accordance with the control operations of FIG. 3. In block 413, for each given correlation peak identified in block 403, the time offset between the start of the local reference timing signal and the time-of-arrival of the given correlation peak is derived and stored.

In block 415, signal quality data, such as the signal-to-interference ratio Ec/Io and aggregate Ec/Io, are measured and stored for each correlation peak/PN index generated in block 415.

In block 417, the pilot delay for each correlation peak index is derived and stored. In block 417, the pilot delay is preferably calculated as the remainder of the division of the time offset calculated in block 413 (in chips) by 64 chips.

In block 419, the pilot delays generated in block 417 are used to identify a baseline pilot from amongst the detected pilot signals. In the preferred embodiment, the baseline pilot originates from a base station that belongs to a cluster of relatively close base stations. The operations of block 419 preferably generate a score for each given detected pilot by accumulating the pilot delay differences between the given detected pilot and the other detected pilots. The detected pilot with the lowest score is selected. In the case that two or more detected pilots share the lowest score, the detected pilot with the highest power from these two or more pilots is selected. The accumulated score of pilot delay differences allows the algorithm to automatically select the baseline pilot that originates from a base station that belongs to a cluster of relatively close base stations. Advantageously, any strong pilot that originates from a relatively far base station will not be considered when selecting the baseline pilot. This reduces errors in the PN index assignment that would otherwise result from such a selection.

In block 421, the pilot delay of the baseline pilot is used to normalize the time offsets and the pilot delays for the other detected pilots. Such normalization is preferably accomplished by:

i) subtracting the pilot delay of the baseline pilot from the time offset of the baseline pilot as well as from the time offset of the other detected pilots; and ii) subtracting the pilot delay of the baseline pilot from itself as well as from the other detected pilots. In the event that any one of the normalized pilot delays is negative, 64 chips are added to the negative delay to make it positive.

In block 423, the PN index (e.g., one of the 512 possible PN indices in the integer range between 0 and 511) for the baseline pilot is recovered from the synchronization channel (e.g., L3 message) in the corresponding CDMA forward link.

Finally, in block 425, for each given detected pilot in the cluster other than the baseline pilot, the time offset of the given detected pilot is mapped to a corresponding PN index based upon the PN index of the baseline pilot and the relative timing between the baseline pilot and the given detected pilot. Preferably, such mapping is accomplished by calculating the difference between the time offset of the baseline pilot and the time offset of the given detected pilot. This difference is divided by 64 chips with the quotient of such division providing an index adjustment that is added to the PN index of the baseline pilot. The index adjustment is a negative integer if the baseline pilot leads the given detected pilot or is a positive integer if the baseline pilot lags the given detected pilot. If the final PN index number turns out to be a negative value, it is corrected MOD (512). After assigning PN indexes to all of the detected pilots, the signal quality data (e.g., the Ec/Io ratio and the aggregate Ec/Io ratio) and the pilot delay for each detected pilot are back-annotated such that they are associated with the PN index assigned thereto in block 425.

The operations of FIG. 4 are illustrated in the following example. Suppose that the pilot scanner device 100 is operating in an indoor or obstructed environment where GPS is unavailable such that the local reference timing signal is used for pilot detection, and the operations of block 401 identifies four correlation peaks with the following parameters:

| Peak # | Time Offset (chips) | Power (dB) |
|---|---|---|
| 1 | 4207 | −11 |
| 2 | 26095 | −14 |
| 3 | 15346 | −12 |
| 4 | 21132 | −8 | wherein the Time Offset is the offset between the start of the local reference timing signal and the time-of-arrival of the given correlation peak.

Because the GPS is unavailable, the operation mode flag is set to use_local_timing and the operations branch to blocks 413–425. In block 417, the pilot delays for the four correlation peaks are derived as follows:

| Peak # | Time Offset (chips) | Pilot Delay (Chips) | Power (dB) |
|---|---|---|---|
| 1 | 4207 | 47 | −11 |
| 2 | 26095 | 47 | −14 |
| 3 | 15346 | 50 | −12 |
| 4 | 21132 | 12 | −8 |

In block 419, the pilot delays generated in block 417 are used to identify a baseline pilot from amongst the detected pilot signals. In the preferred embodiment, the baseline pilot originates from a base station that belongs to a cluster of relatively close base stations. The operations of block 419 preferably generate a score for each given detected pilot by accumulating the absolute pilot delay differences between the given detected pilot and the other detected pilots. The following table shows the absolute delay difference between each pair of pilots and also the accumulated delay (score) of each pilot.

| Peak # | 1 | 2 | 3 | 4 |
|---|---|---|---|---|
| 1 | 0 | 0 | 3 | 35 |
| 2 | 0 | 0 | 3 | 35 |
| 3 | 3 | 3 | 0 | 38 |
| 4 | 35 | 35 | 38 | 0 |
| Score | 38 | 38 | 44 | 112 |

The detected pilot with the lowest score is selected as the baseline pilot. In this case where two detected pilots (peaks #1 and 2) share the lowest score, the detected pilot with the highest power from these two pilots (peak #1) is selected as the baseline pilot.

In block 421, the pilot delay of the baseline pilot is used to normalize the time offsets and the pilot delays for the other detected pilots. Such normalization is preferably accomplished by:
  i) subtracting the pilot delay of the baseline pilot from the time offset of the baseline pilot as well as from the time offset of the other detected pilots; and
  ii) subtracting the pilot delay of the baseline pilot from itself as well as from the other detected pilots.

The normalized time offsets and pilot delays for the four correlation peaks that result follows:

| Peak # | Normalized Time Offset (chips) | Normalized Pilot Delay (Chips) | Power (dB) |
|---|---|---|---|
| 1 | 4160 | 0 | −11 |
| 2 | 26048 | 0 | −14 |
| 3 | 15299 | 3 | −12 |
| 4 | 21085 | −35 | −8 |

In the event that any one of the normalized pilot delays is negative, 64 chips are added to the negative delay to make it positive. Thus, the normalized time offsets and pilot delays for the four correlation peaks are adjusted as follows:

| Peak # | Normalized Time Offset (chips) | Normalized Pilot Delay (Chips) | Power (dB) |
|---|---|---|---|
| 1 | 4160 | 0 | −11 |
| 2 | 26048 | 0 | −14 |
| 3 | 15299 | 3 | −12 |
| 4 | 21085 | −35 + 64 = 29 | −8 |

In block 423, the PN index for the baseline pilot is recovered from the synchronization channel (e.g., L3 message) in the corresponding CDMA forward link. In the illustrative example shown, the PN index of 57 is assigned to the baseline pilot (correlation peak #1).

Finally, in block 425, for each given detected pilot other than the baseline pilot, the time offset of the given detected pilot is mapped to a corresponding PN index based upon the PN index of the baseline pilot and the relative timing between the baseline pilot and the given detected pilot. Such mapping is accomplished by subtracting the time offset of the baseline pilot from the time offset of the given detected pilot. This difference is divided by 64 chips with the quotient of such division providing an index adjustment that is added to the PN index of the baseline pilot. The index adjustment is a negative integer if the baseline pilot leads the given detected pilot or is a positive integer if the baseline pilot lags the given detected pilot. If the final PN index number turns out to be a negative value, it is corrected MOD (512). Such operations provide the following results:

| Peak # | PN Index # | Normalized Time Offset (chips) | Normalized Pilot Delay (Chips) | Power (dB) |
|---|---|---|---|---|
| 1 | 57 (from synch) | 4160 | 0 | −11 |
| 2 | 57 + 342 = 399 | 26048 | 0 | −14 |
| 3 | 57 + 174 = 231 | 15299 | 3 | −12 |
| 4 | 57 + 264 = 321 | 21085 | 29 | −8 |

After assigning the PN indexes to all of the detected pilots, the signal quality data (e.g., the Ec/Io ratio and the aggregate Ec/Io ratio) and the pilot delay for each detected pilot are back-annotated such that they are associated with the PN index assigned thereto in block 425.

Advantageously, the pilot scanning apparatus of the present invention is easy to use because it can be efficiently controlled by the user to operate in different operational modes. Such operational modes preferably include a GPS priority mode and an Indoor mode. In the GPS priority mode, the PN indices are assigned to detected pilot signals based upon a GPS-derived timing reference signal when the GPS signal is available and based upon a locally-generated timing reference signal when the GPS signal is not available. In the Indoor mode, the PN indices are assigned to detected pilot signals based upon a locally-generated timing reference signal (irrespective of whether or not the GPS signal is not available). Moreover, the pilot scanning apparatus of the present invention preferably uses an improved algorithm to identify the pilot signal that is used as a timing reference for PN index assignment in the event that GPS-based timing signals are not available. The algorithm selects the reference pilot signal by analyzing pilot delays that represent the offset of the time-of-arrival of the detected pilots from ideal 64 chip intervals. The pilot delays are processed to identify a cluster of base stations that are geographically in relatively close proximity to one another. The reference pilot signal is selected from this cluster. In this manner, the PN index assignment operations that depend upon such selection has improved accuracy over the prior art methods when used in applications where the GPS signal is not available.

There have been described and illustrated herein several embodiments of a pilot scanning apparatus for spread spectrum cellular radio communication systems, such as a CDMA network, and associated methods of operation. While particular embodiments of the invention have been described, it is not intended that the invention be limited thereto, as it is intended that the invention be as broad in scope as the art will allow and that the specification be read likewise. Thus, while particular spread spectrum architectures have been disclosed, it will be appreciated that other spread spectrum architectures that rely on beacon signals for synchronization between base stations and mobile units can be used as well. In addition, while particular timing signals have been disclosed, it will be understood that other timing signals can be used in different architectures. It will therefore be appreciated by those skilled in the art that yet other modifications could be made to the provided invention without deviating from its spirit and scope as claimed.

What is claimed is:

1. An apparatus for discovering beacon signals communicated from base stations to mobile units in a spread spectrum radio communication system, wherein the beacon signals comprise a common code sequence that is transmitted at predetermined phase delays relative to one another, each predetermined phase delay having an index value associated therewith, and wherein the beacon signals are part of corresponding channels between the base stations and the mobile units, the apparatus comprising:
   a radio subsystem that downconverts a received RF signal to a baseband signal and samples the baseband signal to derive baseband samples in digital form that represent at least one received beacon signal;
   buffer means, operably coupled to said radio subsystem, for storing said baseband samples;
   means for generating a local reference timing signal; and
   beacon discovery means, operably coupled to said buffer means and said means for generating a local reference timing signal, for
      i) correlating said baseband samples with said common code sequence over different phase delays to identify a set of correlation peaks that correspond to a plurality of detected beacon signals,
      ii) for each correlation peak in the set of i), deriving and storing a time offset based upon said local reference timing signal,
      iii) for each correlation peak in the set of i), deriving and storing a time delay relative to said time offset, said time delay based upon said time offset for the correlation peak in ii) and said predetermined phase delays, wherein said time delay is indicative of a distance between said apparatus and a base station that transmits a detected beacon signal corresponding to the correlation peak,
      iv) identifying a particular detected beacon signal within said plurality of detected beacon signals, said particular detected beacon signal satisfying a constraint based upon said time delay of each correlation peak derived in iii),
      v) recovering the index value for said particular detected beacon signal from a channel corresponding to said particular detected beacon signal, and
      vi) for each given detected beacon signal within a subset of said plurality of detected beacon signals that does not include said particular detected beacon signal, assigning and storing an index value to said given detected beacon signal based upon the recovered index value for said particular detected beacon signal and relative timing between said particular detected beacon signal and said given detected beacon signal.

2. An apparatus according to claim 1, wherein:
said beacon discovery means derives and stores signal quality data pertaining to said set of correlation peaks, and associates the stored index values assigned to the detected beacon signals to said signal quality data for subsequent processing operations.

3. An apparatus according to claim 1, wherein:
said beacon discovery means derives said relative timing between said particular detected beacon signal and said given detected beacon signal by normalizing said time offset for said given detected beacon signal in accordance with said time delay for said particular detected beacon signal.

4. An apparatus according to claim 3, wherein:
said beacon discovery means normalizes said time delay for said given detected beacon signal in accordance with said time delay for said particular detected beacon signal.

5. An apparatus according to claim 1, wherein:
said constraint is further based upon a received power level of said correlation peaks.

6. An apparatus according to claim 1, wherein:
said constraint is realized by, for each given detected beacon signal in said plurality of detected beacon signals, summing differences between said time delay for a given detected beacon signal and for each other detected beacon signal to derive a score for the given detected beacon signal, and identifying the detected beacon signal with the lowest score as said particular detected beacon signal.

7. An apparatus according to claim 6, wherein:
in the event that a set of detected beacon signals share the lowest score, identifying one of said set with highest power as said particular detected beacon signal.

8. An apparatus according to claim 1, further comprising:
a GPS receiver for receiving and recovering a GPS signal; and
means for generating a second timing reference signal based upon said GPS signal;
wherein said beacon discovery means is operably coupled to said means for generating a second timing reference signal.

9. An apparatus according to claim 1, wherein:
said beacon discovery means operates in a first predetermined operational mode to perform i) through vii), and operates in a second predetermined operational mode to:
   viii) for each correlation peak, derive and store a time offset based upon said second timing reference signal, and
   ix) for each given detected beacon signal, assign and store an index value to said given detected beacon signal based upon said time offset and said predetermined phase delays.

10. An apparatus according to claim 9, wherein:
operations of said beacon discovery means in said second predetermined operation mode further include:

x) for each correlation peak, deriving and storing a time delay relative to said time offset, said time delay based upon said time offset for the correlation peak.

11. An apparatus according to claim 1, wherein:
said spread spectrum radio communication system comprises a CDMA network.

12. An apparatus according to claim 11, wherein:
said beacon signals are pilot signals with an index value ranging from 0 to 511 corresponding to phase offsets that are 64 chips apart.

13. An apparatus according to claim 1, wherein:
at least one of said buffer means, said means for generating a local reference timing signal, and said beacon discovery means is realized as part of a processing platform.

14. An apparatus according to claim 13, wherein:
said processing platform comprises at least one of an digital signal processor, an FPGA, and an ASIC.

15. An apparatus for discovering beacon signals communicated from base stations to mobile units in a spread spectrum radio communication system, wherein the beacon signals comprise a common code sequence that is transmitted at predetermined phase delays relative to one another, each predetermined phase delay having an index value associated therewith, and wherein the beacon signals are part of corresponding channels between the base stations and the mobile units, the apparatus comprising:
a radio subsystem that downconverts a received RF signal to a baseband signal and samples the baseband signal to derive baseband samples in digital form that represent at least one received beacon signal;
buffer means, operably coupled to said radio subsystem, for storing said baseband samples;
means for generating a local reference timing signal;
a GPS receiver for receiving and recovering a GPS signal;
means for generating a second timing reference signal based upon said GPS signal;
beacon discovery means, operably coupled to said buffer means, said means for generating a local reference timing signal, and means for generating a second timing signal that is operable in a first operational mode and a second operational mode,
wherein in said first operational mode, said beacon discovery means employs said local reference timing signal as a first time reference for operations that assign indices to detected beacon signals; and
wherein in said second operational mode, said beacon discovery means employs said second timing signal as a second time reference for operations that assign indices to detected beacon signals; and
control means for selectively switching between said first operational mode and said second operation mode in accordance with a plurality of user-selectable modes dictated by user input.

16. An apparatus according to claim 15, wherein:
said plurality of user-selectable modes comprises a GPS-priority mode whereby said control means automatically switches to said second operation mode when said GPS receiver is receiving said GPS signal and automatically switches to said first operational mode when said GPS receiver is not receiving said GPS signal.

17. An apparatus according to claim 15, wherein:
said plurality of user-selectable modes comprises an Indoor mode whereby said control means automatically operates in said first operational mode irrespective of whether said GPS receiver is receiving said GPS signal.

18. An apparatus according to claim 15, wherein:
said spread spectrum radio communication system comprises a CDMA network, and said beacon signals are pilot signals with an index value ranging from 0 to 511 corresponding to phase offsets that are 64 chips apart.

19. A method for discovering beacon signals communicated from base stations to mobile units in a spread spectrum radio communication system, wherein the beacon signals comprise a common code sequence that is transmitted at predetermined phase delays relative to one another, each predetermined phase delay having an index value associated therewith, and wherein the beacon signals are part of corresponding channels between the base stations and the mobile units, the method comprising:
downconverting a received RF signal to a baseband signal and sampling the baseband signal to derive baseband samples in digital form that represent at least one received beacon signal;
storing said baseband samples;
generating a local reference timing signal; and
discovering beacon signals by:
i) correlating said baseband samples with said common code sequence over different phase delays to identify a set of correlation peaks that correspond to a plurality of detected beacon signals,
ii) for each correlation peak in the set of i), deriving and storing a time offset based upon said local reference timing signal,
iii) for each correlation peak in the set of i), deriving and storing a time delay relative to said time offset, said time delay based upon said time offset for the correlation peak in ii) and said predetermined phase delays, wherein said time delay is indicative of a distance between said apparatus and a base station that transmits a detected beacon signal corresponding to the correlation peak,
iv) identifying a particular detected beacon signal within said plurality of detected beacon signals, said particular detected beacon signal satisfying a constraint based upon said time delay of each correlation peak derived in iii),
v) recovering the index value for said particular detected beacon signal from a channel corresponding to said particular detected beacon signal, and
vi) for each given detected beacon signal within a subset of said plurality of detected beacon signals that does not include said particular detected beacon signal, assigning and storing an index value to said given detected beacon signal based upon the recovered index value for said particular detected beacon signal and relative timing between said particular detected beacon signal and said given detected beacon signal.

20. A method according to claim 19, further comprising:
deriving and storing signal quality data pertaining to said set of correlation peaks; and
associating the stored index values assigned to the detected beacon signals to said signal quality data for subsequent processing operations.

21. A method according to claim 19, wherein:
said relative timing between said particular detected beacon signal and said given detected beacon signal is derived by normalizing said time offset for said given detected beacon signal in accordance with said time delay for said particular detected beacon signal.

22. A method according to claim 21, further comprising:
normalizing said time delay for said given detected beacon signal in accordance with said time delay for said particular detected beacon signal.

23. A method according to claim 19, wherein:
said constraint is further based upon a received power level of said correlation peaks.

24. A method according to claim 19, wherein:
said constraint is realized by, for each given detected beacon signal in said plurality of detected beacon signals, summing differences between said time delay for a given detected beacon signal and for each other detected beacon signal to derive a score for the given detected beacon signal, and identifying the detected beacon signal with the lowest score as said particular detected beacon signal.

25. A method according to claim 24, further comprising:
in the event that a set of detected beacon signals share the lowest score, identifying one of said set with highest power as said particular detected beacon signal.

26. A method according to claim 19, further comprising:
receiving and recovering a GPS signal; and
generating a second timing reference signal based upon said GPS signal.

27. A method according to claim 19, further comprising:
operating in a first predetermined operational mode to perform i) through vii), and operating in a second predetermined operational mode to discover beacon signals by:
viii) for each correlation peak in the set of i), deriving and storing a time offset based upon said second timing reference signal, and
ix) for each given detected beacon signal, assigning and storing an index value to said given detected beacon signal based upon said time offset and said predetermined phase delays.

28. A method according to claim 27, wherein:
said second predetermined operation mode further includes:
x) for each correlation peak in the set of i), deriving and storing a time delay relative to said time offset, said time delay based upon said time offset for the correlation peak.

29. A method according to claim 19, wherein:
said spread spectrum radio communication system comprises a CDMA network.

30. A method according to claim 29, wherein:
said beacon signals are pilot signals with an index value ranging from 0 to 511 corresponding to phase offsets that are 64 chips apart.

* * * * *